(12) United States Patent
Takahashi et al.

(10) Patent No.: US 6,640,160 B2
(45) Date of Patent: Oct. 28, 2003

(54) BIPED AMBULATORY ROBOT

(75) Inventors: Hideaki Takahashi, Wako (JP); Hiroshi Matsuda, Wako (JP); Susumu Miyazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,346

(22) Filed: Nov. 14, 2001

(65) Prior Publication Data

US 2002/0062178 A1 May 23, 2002

(30) Foreign Application Priority Data

Nov. 17, 2000 (JP) ......................................... 2000-351752

(51) Int. Cl.$^7$ .............................................. G06F 19/00
(52) U.S. Cl. ....................... 700/245; 700/246; 700/247; 700/249; 700/258; 700/260; 700/264; 318/568.1; 318/568.12; 318/568.17; 318/568.22; 901/1; 901/48; 901/50
(58) Field of Search ................................. 700/246, 245, 700/249, 256, 260, 264, 247; 318/568.12, 568.17, 568.1, 568.22; 901/1, 48, 50

(56) References Cited

U.S. PATENT DOCUMENTS

| | | | |
|---|---|---|---|
| 5,459,659 A | | 10/1995 | Takenaka |
| 5,808,433 A | * | 9/1998 | Tagami et al. .......... 318/568.17 |
| 5,936,367 A | * | 8/1999 | Takenaka ................ 318/568.12 |
| 6,243,623 B1 | * | 6/2001 | Takenaka et al. ....... 318/568.12 |
| 6,266,576 B1 | * | 7/2001 | Okada et al. .............. 700/245 |
| 6,317,652 B1 | * | 11/2001 | Osada ......................... 700/245 |

FOREIGN PATENT DOCUMENTS

JP        05-337849        12/1993

OTHER PUBLICATIONS

Nicholls, Bipedal dynamic walking in robotics, 1998, Internet, pp. 1–74.*
Hirai et al.The development of Honda humanoid robot, 1998, IEEE, pp. 1321–1326.*
Hwang et al., Motion planning of eye, hand and body of humanoid robot, 1997, IEEE, pp. 231–236.*
Alkenson et al., Using humanoid robot to study human behavior, 2000, Internet, pp. 46–56.*
Dasgupta et al., Making feasible walking motion of humanoid robots from human motion capture data, 1999, IEEE, pp. 1044–1049.*
Ishiguro et al., Robotive: A robot generates episode chanins in our daily file, Apr. 2001, Internet, pp. 1–6.*
Price et al., A lightweight plastic robotic humanoid, 2000, Internet/IEEE, pp. 1571–1576.*
Konno et al., Development of a light–weight biped humanoid robot, IEEE, 2000, pp. 1565–1570.*

* cited by examiner

*Primary Examiner*—William A. Cuchlinski, Jr.
*Assistant Examiner*—McDieunel Marc
(74) *Attorney, Agent, or Firm*—Arent Fox Kintner Plotkin & Kahn, PLLC

(57) ABSTRACT

A biped ambulatory robot is provided having a structure in which the electrical storage device is arranged to reduce the load on the joints (particularly the knee joints) of the leg members of the robot and to enable easy maintenance of stability of the robot posture. The electrical storage device 19 which is a power supply for operation of the robot is installed on the electrical storage device unit 16 of the torso 1 of the robot, such that the center of gravity A of the electrical storage device exists on the forward side from the center of gravity B of the robot when in a vertically-erect posture and with the electrical storage device 19 removed. In a state in which the robot stands normally on the floor F with the knee joints 14 of the leg members 2 bent forward slightly, the center of gravity C of the entire robot including the electrical storage device 19 exists substantially directly above the knee joints 14 as seen from one side of the robot.

4 Claims, 3 Drawing Sheets

BIPED AMBULATORY ROBOT

BACKGROUND OF THE INVENTION

1. Field of the Invention

This invention relates to a biped ambulatory robot.

2. Description of the Related Art

The biped ambulatory robots which the inventors and others have striven to put into practical use in recent years are, in essence, humanoid robots; in well-known biped ambulatory robots, similarly to humans, two leg members are provided extending from a hip portion at the lower end of an upper body or torso, and two arm members are provided extending from shoulder portions on the right and left sides of the torso.

In this type of robot, the operation power to operate the leg members, arm members or the like can also be supplied to the robot from outside via a cable. However, the operable range of such a robot is limited, and cable handling becomes complicated. Consequently, it is preferable that the robot itself be equipped with a battery or other electrical storage device as a power supply for operation.

However, when an electrical storage device is provided to the robot as the power supply for operation of the robot, an electrical storage device of comparatively large capacity is necessary in order to secure sufficient continuous operating time, so that the electrical storage device is comparatively large and heavy. In view of the construction of a biped ambulatory robot, the above electrical storage device is generally mounted on the torso of the robot.

However, the torso, including the electrical storage device, of a biped ambulatory robot with such an electrical storage device mounted on the torso is heavy, and when the robot is standing on the floor in a substantially vertically erect posture, a load tends to act on the joints of the leg members supporting the torso. In particular, in order to secure the stability of the posture of a biped ambulatory robot when standing on a floor, it is preferable that the knee joints of both leg members be bent slightly in the forward direction, in this case, if the mounted location of the electrical storage equipment on the torso of the robot is inappropriate, then a large load tends to act on the knee joints of the leg members (a large torque acts on the knee joints from the torso of the robot). In this case, the capacity of the actuators (electric motors) for the knee joints must be increased, but the knee joint actuators tend to be constrained by structure and size parameters, and it is difficult to greatly increase the capacity.

Also, compared with robots having numerous leg members, by its nature a biped ambulatory robot tends to easily lose stability of posture upon receiving an external disturbance or other influence.

For these reasons, the question of where, and in what configuration, to install the heavy electrical storage device on the torso of the robot has been an important problem for purposes of lightening the load acting on the joints (particularly the knee joints) of leg members, and for securing stability of the robot posture.

This invention was devised in light of the above considerations, and has as an object the provision of a biped ambulatory robot having an electrical storage device placement structure which reduces the load on the joints (particularly the knee joints) of the robot leg members, and enables the easy securing of stability of the robot posture.

Another object of this invention is to provide a biped ambulatory robot enabling easy attachment to and detachment from the robot of the electrical storage device.

SUMMARY OF THE INVENTION

In order to attain these objects, the biped ambulatory robot of this invention comprises an electrical storage device as a power supply for robot operation and two leg members, and which stands on a floor on a standing posture in which a knee joint in the middle portion of each of the leg members is bent further in the forward direction from the robot than in a vertically-erect posture in which each of the leg members is extended in the vertical direction, wherein said electrical storage device is mounted in an electrical storage device unit provided on the torso of said robot, such that the center of gravity of said electrical storage device exists at a position further forward than the center of gravity of the robot without said electrical storage device in the vertically-erect posture, and the center of gravity of the robot with the electrical storage device thus mounted in the standing posture exists substantially directly above the knee joint of each of the leg members, as seen from one side of the robot.

In this specification, the vertically-erect posture of the robot means the posture in which the two leg members of the robot are extended in the vertical direction, and the entire robot is extended in the vertical direction. The above standing posture is the same posture as the above vertically-erect posture for each of the components of the robot other than the two leg members (torso, arm members, or the like). In this specification, the anteroposterior direction of the robot is the direction perpendicular to both the direction in which the two leg members of the robot are aligned while the robot is in the vertically-erect posture (the robot lateral direction), and to the vertical direction.

In this invention, by ensuring that the center of gravity of the above electrical storage device, in the state in which the electrical storage device is mounted in the above electrical storage device unit, exists in a position which is further forward than the center of gravity of the robot in the case where the robot is in the vertically-erect posture and the electrical storage device is removed, when the robot is viewed from one side (when the robot is viewed from a lateral direction) in the above standing posture with the knee joints of the two leg members of the robot bent somewhat toward the front compared with the vertically-erect posture, the center of gravity of the entire robot, including the above electrical storage device, is made to exist in a position which is substantially directly above the knee joints of the two leg members of the robot. As a result, in the above standing posture, as the basic posture when the robot is standing normally on a floor, the torque acting on the knee joint of each leg member from the upper side of the robot is comparatively small, and the load acting on the knee joints is lightened.

Further, control is generally exercised to stabilize the posture of biped ambulatory robots based on an inverted-pendulum dynamic model such as that disclosed for example in Japanese Patent Laid-open No. 5-337849 or in U.S. Pat. No. 5,459,659. This posture-stabilization control uses the behavior of an inverted pendulum in a pseudo-representation of the behavior characteristics of perturbations in the upper-body position of the robot, to control the torque about the ankles of the robot. In a robot for which such posture stabilization control is performed, there are cases in which it is preferable, as a means of securing a stabilized robot standing posture, that, in the above standing posture, a torque which causes the robot to lean forward somewhat acts from the upper-body side about the ankles of both leg members of the robot. In the case of the biped ambulatory robot of this invention, the center of gravity of the entire robot as seen from one side of the robot is positioned substantially directly above the knee joints of the leg members, bent in the forward direction, so that such a torque is made to act about the ankles from the torso. As a result, stability of the standing posture of the robot is easily secured.

In this way, by means of the biped ambulatory robot of this invention, the load acting on by the knee joints of the robot leg members when the robot is in a posture of standing on a floor is lightened, and in addition, stability of the robot posture is easily secured.

As described above, this invention is especially preferable for biped ambulatory robots which perform posture stabilization control based on an inverted-pendulum dynamic model.

In this invention, said electrical storage device is mounted in said electrical storage device unit such that said electrical storage device is installed and removed via an aperture provided in either the front surface or the rear surface of the torso of said robot.

As a result, with the robot lying supine, facing upward, or lying prone, facing downward, the electrical storage device is removed from or mounted in the electrical storage device unit, so that attachment and removal of the electrical storage device is performed easily without the robot tipping or the like.

Further, in this invention said aperture is provided in the front surface of the torso of said robot, and said electrical storage device unit is provided in a position enabling installation and removal of said electrical storage device via said aperture by operation of arm members extending from the torso of said robot, further comprising auxiliary power supply means, other than the electrical storage device, which supplies power for the robot operation when installing and removing said electrical storage device by operation of the arm members.

By this means, the above electrical storage device is removed from, or installed in, the electrical storage device unit through operation of the arm members of the above robot itself, while the arm members of the robot are operated through power supplied by the above auxiliary power supply means is being operated. Hence attachment and detachment of the electrical storage device is easily performed by the robot itself.

The above auxiliary power supply means maybe, for example, an auxiliary electrical storage device (which need not have such large capacity), mounted on the robot in addition to the above electrical storage device. Alternatively, the auxiliary power supply means may be a component, provided on the robot exterior, which is connected by freely attaching to and detaching from a commercial power supply or other external power supply, and which receives operating power from the external power supply (specifically, a component comprising a cable for connection to the above external power supply, and a rectifying circuit, voltage regulator circuit or the like).

In this invention, in which an electrical storage device is freely attached and detached via the above aperture as described above, in a state in which said electrical storage device to said electrical storage device unit releasably, in the state in which the electrical storage device is mounted in the electrical storage device unit.

As a result, through the above clasping means, it is possible to prevent the unintended separation of the above electrical storage device via the above aperture due to shock or other force applied to the robot during robot operation.

DESCRIPTION OF THE PREFERRED EMBODIMENTS

Figure 1:
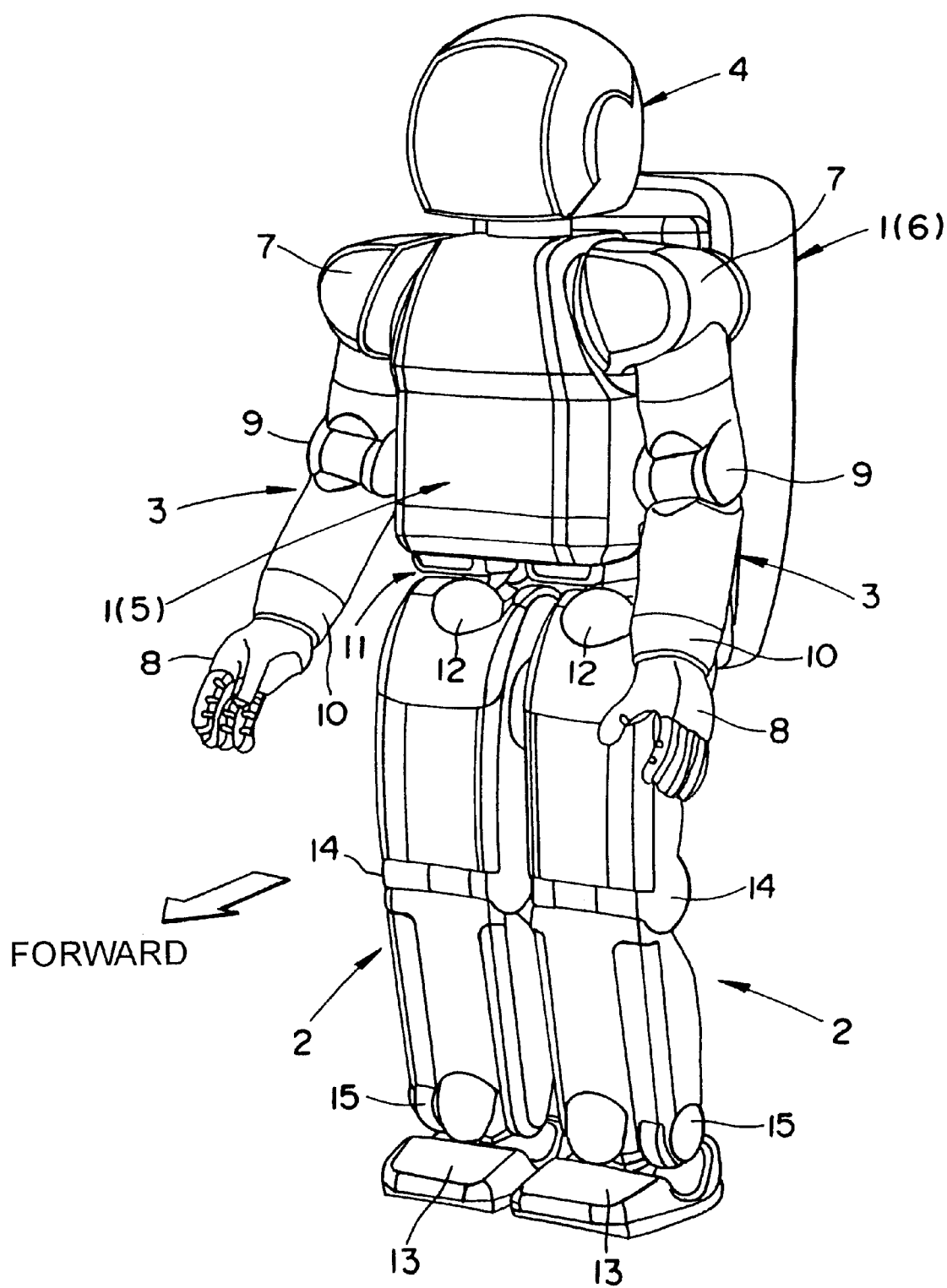
FIG. 1 is a perspective view showing the entire configuration of one embodiment of the biped ambulatory robot of this invention.
Figure 2:
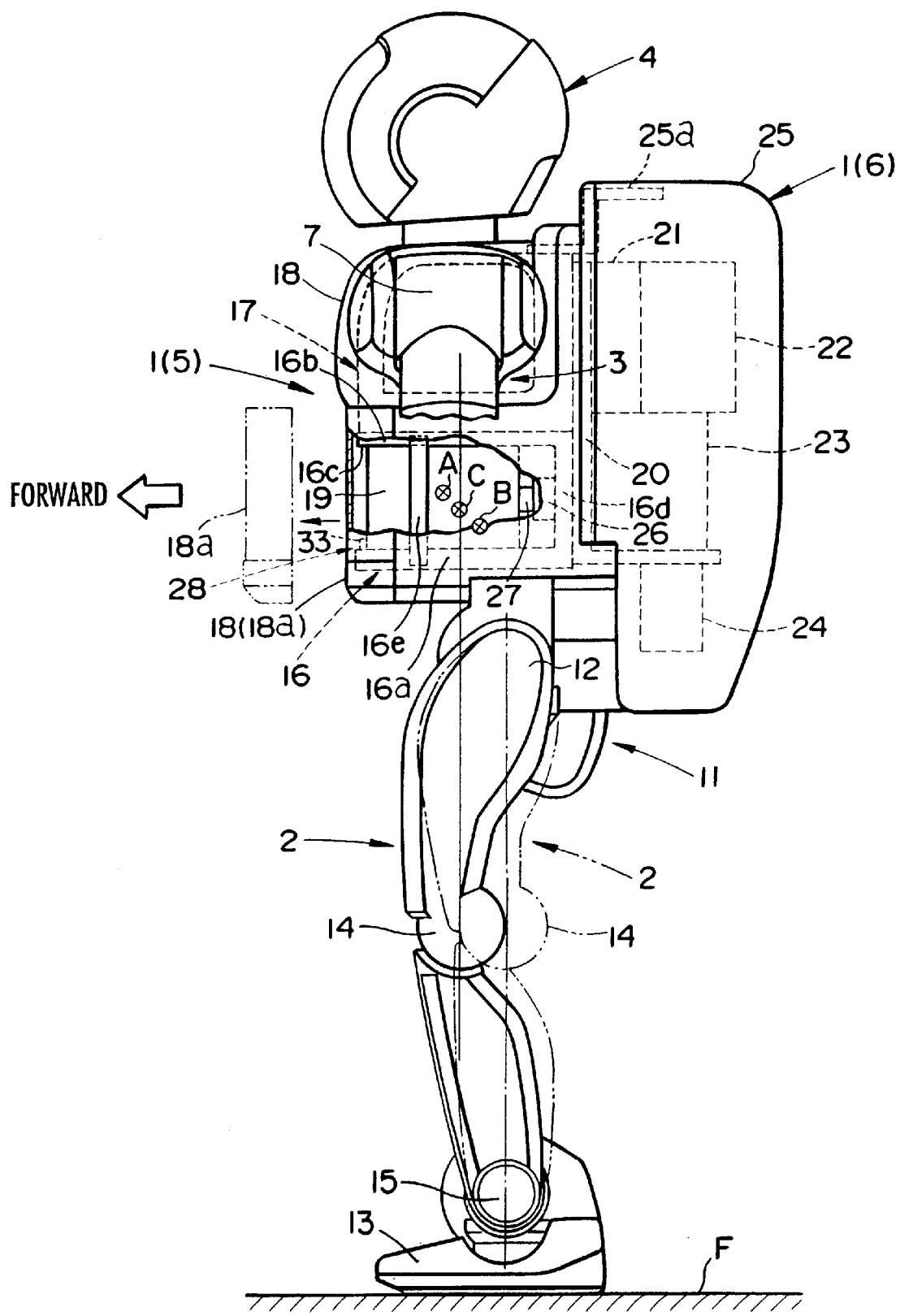
FIG. 2 is a side view of the robot of FIG. 1.
Figure 3:
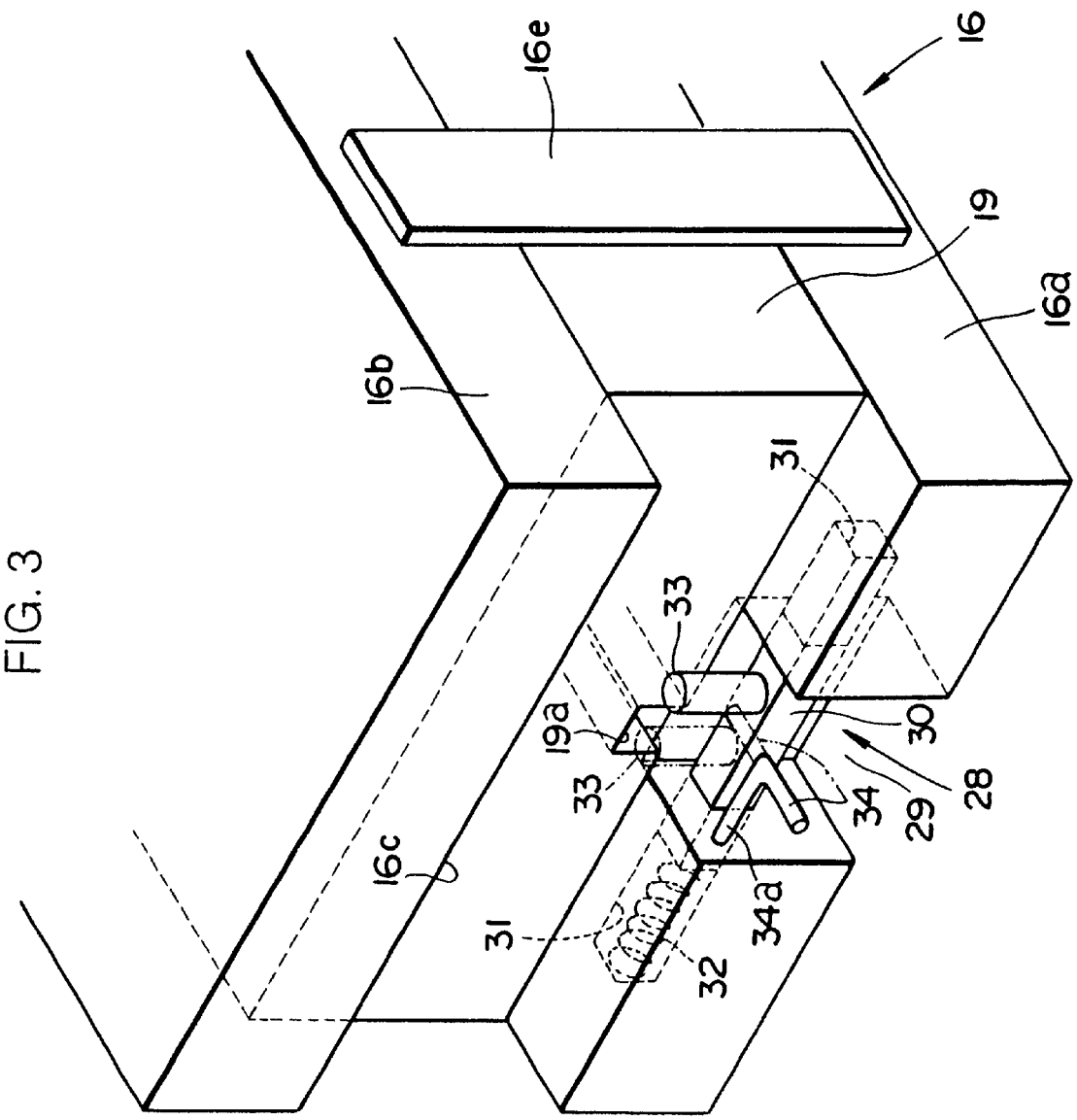
FIG. 3 is a perspective view showing the configuration of the clasping mechanism of the electrical storage device comprised by the robot of FIG. 1.

An embodiment of the biped ambulatory robot of the present invention is explained referring to FIG. 1 through FIG. 3. FIG. 1 is a perspective view showing the entire configuration of the biped ambulatory robot of this embodiment; FIG. 2 is a side view of the robot; and FIG. 3 is a perspective view showing the configuration of the clasping mechanism of the electrical storage device comprised by the robot.

First, the overall configuration of the biped ambulatory robot of this embodiment is explained in summary, referring to FIG. 1. The robot is a humanoid robot, comprising an upper body or torso 1, a pair of leg members 2, 2, a pair of arm members 3, 3, and a head member 4.

The torso 1 of this robot comprises a main body 5, from which the leg members 2, 2 and arm members 3, 3 extend, and which supports the head member 4, and a sub-body 6, provided on the rear surface of the main body 5.

Shoulder portions 7, 7 are formed on both the left and right sides of the upper portion of the main body 5, and an arm member 3 extends from a shoulder joint mechanism, not shown, incorporated into each of these shoulder portions 7. Each arm member 3 has, between the hand portion 8 and shoulder portion 7, in order from the side of the shoulder portion 7, an elbow joint 9 and a wrist joint 10.

A hip portion (waist portion) 11 is formed at the lower end of the main body 5; from a pair of thigh joints 12, 12 provided on the right and left sides of this hip portion 11, the respective leg members 2 extend downward. Each of the leg members 2 has, between the foot portion 13 and thigh joint 12, in order from the thigh joint 12, a knee joint 14 and an ankle joint 15.

Each of the joints of the above leg members 2 and arm members 3 is driven by an electric motor, not shown. The above head portion 4 is supported by the upper end of the main body 5, and incorporates an image pickup device (not shown) for visual perception by the robot.

The structure of the above torso 1 is here explained, referring to FIG. 2. The main body 5 of the torso 1 incorporates, on the upper side of the above hip portion 11, an abdominal body frame 16 in the portion corresponding to the abdomen of the main body 5, and also incorporates, in the upper portion of the main body 5 (the portion corresponding to the chest), an upper body frame 17, fixed in place above the abdominal body frame 16. The main body 5 comprises a plurality of exterior panel members 18, covering the front and side surfaces of these body frames 16, 17, and installed on the body frames 16, 17. The abdominal body frame 16 is linked to the thigh joints 12 of each leg member 2 via a link mechanism or similar, not shown, incorporated in the hip portion 11 at the lower end of the main body 5.

Of the exterior panel members 18, the abdominal exterior front panel 18a covering the front surface of the abdominal body frame 16, though not shown in detail, is mounted in a freely attachable and detachable manner to the abdominal body frame 16 by, for example, installing protruding members provided in the rear face into latching holes provided in the abdominal body frame 16. The abdominal exterior front panel 18*a* can then be removed from the abdominal body frame 16 by moving in the forward direction, as shown by broken lines in FIG. 2.

A detailed explanation is given below, but an electrical storage device 19 is mounted, in attachable and detachable manner, on the abdominal body frame 16 as the main operating power supply for the robot.

The above sub-body 6 of the torso 1 incorporates a sub-body frame 20 fixed on the rear surface of the above abdominal body frame 16 and the upper body frame 17. On this sub-body frame 20 are mounted a driver circuit unit 21 for an electric motor (not shown) to drive each of the joints of the above leg members 2 and arm members 3; a control unit 22 (hereafter ECU 22) which handles control of robot operation; a DC/DC converter 23 which converts the voltage level of the above electrical storage device 19 into the level required for operation of electrical motors or the like; and an auxiliary electrical storage device 24 as an auxiliary power supply means to supply power for temporary operation of the robot. A cabinet-shape body cover 25, which covers the driver circuit unit 21, ECU 22, DC/DC converter 23, and auxiliary electrical storage device 24, is mounted on a bracket 25*a* extending from the above upper body frame 17. The sub-body 6 is thus configured.

The above abdominal body frame 16 of the main body 5 functions as an electrical storage device unit in which the above electrical storage device 19 is mounted, and is formed in a U-shape as seen from one side. In this abdominal body frame 16, the electrical storage device 19 is accommodated in the space between an upper horizontal posture frame 16*b* and a lower horizontal posture frame 16*a* (hereafter, this space is referred to as the interior space of the abdominal body frame 16), the electrical storage device 19 is supported on the lower horizontal posture frame 16*a* in a manner enabling free sliding in the anteroposterior direction. Here the aperture 16*c* in the front end of the abdominal body frame 16 opens toward the front of the robot when the above abdominal exterior front panel 18*a* is removed, as described above. The above electrical storage device 19 is installed, in a manner enabling installation and removal, into the interior space of the abdominal body frame 16, from the above aperture 16*c* toward the vertical posture frame 16*d* at the back end of the abdominal body frame 16, and thereby mounted in the abdominal body frame 16.

A receiving connector 26 is provided, protruding toward the front, on the vertical posture frame 16*d* on the back end of the abdominal body frame 16, and is connected to the above DC/DC converter 23. A power feed-connector 27 (connector to output the voltage of the electrical storage device 19), which mates with and is freely attached to and detached from the receiving connector 26, is provided on the rear surface of the electrical storage device 19. The power feed connector 27 mates with the receiving connector 26 when the electrical storage device 19 is installed into the interior space of the abdominal body frame 16 as described above.

Plate members 16*e* are mounted on both the left and right side surfaces of the abdominal body frame 16; the lateral-direction (width direction) position of the electrical storage device is constrained by these plate members 16*e*.

In this embodiment, the center of gravity of the electrical storage device 19 in the state in which, as described above, the electrical storage device 19 is mounted in the abdominal body frame 16, is for example at point A in FIG. 2 (hereafter, point A is called the electrical storage device center of gravity A). Further, if the two leg members 2, 2 are extended in the vertical direction as shown by the broken lines in FIG. 2, and the two arm members 3, 3 are extended downward in the vertical direction, and the entire robot is extended in the vertical direction, in the vertically erect robot posture, then the center of gravity of the entire robot in a state in which the electrical storage device 19 is removed from the abdominal body frame 16 exists at, for example, point B in FIG. 2. Hence the abdominal body frame 16 is provided such that the electrical storage device 19 is mounted at a position such that the electrical storage device center of gravity A exists somewhat further forward than the center of gravity B (hereafter called the vertically-erect posture fundamental center of gravity B) when the robot, with electrical storage device 19 excluded, is in the vertically-erect posture. Details are described below, but in this embodiment, when the robot is made to stand on the floor F with the electrical storage device 19 mounted in the abdominal body frame 16 as described, below, the center of gravity of the entire robot exists between the above electrical storage device center of gravity A and the vertically-erect posture fundamental center of gravity B, at the point C in FIG. 2.

As explained above, an abdominal body frame 16 equipped with an electrical storage device 19 is further provided with a clasping mechanism 28 (clasping means) to clasp the electrical storage device 19 at the front end of the lower horizontal posture frame 16*a* to the abdominal body frame 16.

This clasping mechanism 28 may be, for example, configured as shown in FIG. 3. That is, the clasping mechanism 28 comprises a rod 30 provided so as to traverse, in the lateral direction, the cut-out portion 29 formed in the front end of the lower horizontal posture frame 16*a* of the abdominal body frame 16. The two ends of the rod 30 are installed into the installation holes 31, 31 formed in the lower horizontal posture frame 16*a*, in a manner enabling free sliding in the lateral direction. Further, the left end of the rod 30 is impelled in the rightward direction by a spring 32 housed in the left-side installation hole 31. In the portion of the rod 30 exposed in the above cut-out portion 29 is formed a clasping pin 33, protruding upward. Normally, with the electrical storage device 19 mounted in the abdominal body frame 16, this clasping pin 33 is moved together with the rod 30 to the position indicated by the solid lines in FIG. 3 by the impelling force of the spring 32. At this position, the clasping pin 33 is in contact with the front surface, of the electrical storage device 19, and as a result the electrical storage device 19 is clasped such that it cannot be removed from the interior space of the abdominal body frame 16 (below, the position of the clasping pin 33 indicated by solid lines in FIG. 3 is called the clasped position).

On the other hand, in this embodiment a groove 19*a* is formed in the lower surface of the electrical storage device 19, extending in the anteroposterior direction from the front edge to the back edge. The clasping pin 33 of the above clasping mechanism 28, when moved in opposition to the impelling force of the above spring 32 in the leftward direction to the position indicated by the broken lines in FIG. 3, opposes the groove 19*a* in such a manner that the upper end of the clasping pin 33 can enter into the groove 19*a* in the electrical storage device 19 mounted in the abdominal body frame 16. In such a state in which the upper end of the clasping pin 33 opposes the groove 19*a* in the electrical storage device 19, by moving the electrical storage device 19 in the anteroposterior direction, the electrical storage device 19 is installed into and removed from the interior space of the abdominal body frame 16 (hereafter, the position of the clasping pin 33 indicated by the broken lines in FIG. 3 is called the unclasped position). Further, the clasping mechanism 28 comprises a lock pin 34, mounted to enable rotation about the shaft portion 34a on the lower horizontal posture frame 16a facing the above cut-out portion 29. When, with the above clasping pin 33 moved into the above unclasped position, this lockpin 34 is rotated 180° about the shaft portion 34a from the state shown by the solid lines in FIG. 3, the lock pin 34 makes contact with the lower portion of the right-hand surface of the clasping pin 33, as shown by the broken lines in FIG. 3. As a result, the clasping pin 33 is locked together with the rod 30 in the unclasped position by the lock pin 34, opposing the impelling force of the spring 32.

In a clasping mechanism 28 configured in this way, by moving the clasping pin 33 to the unclasped position in opposition to the impelling force of the spring 32 and using the lock pin 34 to lock the clasping pin 33 in the unclasped position, the electrical storage device 19 is removed from or installed into the interior space of the abdominal body frame 16 in the anteroposterior direction. Here, during movement of the electrical storage device 19 in the anteroposterior direction, the upper end of the clasping pin 33 moves along the interior of the groove 19a in the electrical storage device 19. When the electrical storage device 19 is installed from the above aperture 16c into the interior space of the abdominal body frame 16, and the above power feed connector 27 of the electrical storage device 19 is mated with the above receiving connector 26, the clasping pin 33 withdraws from within the groove 19a of the electrical storage device 19. In this state, when the lock on the clasping pin 33 by the lock pin 34 is released, the impelling force of the spring 32 causes the clasping pin 33 to move from the unclasped position to the clasped position. Having moved to the clasped position, the clasping pin 33 makes contact with the front surface of the electrical storage device 19, and by this means the electrical storage device 19 is clasped such that removal from the interior space of the abdominal body frame 16 is not possible.

Though not shown in FIG. 2, the clasping pin 33 and lock pin 34 of the clasping mechanism 28 exist in positions which is reached by the hand portion 8 of each arm member 3 of the above robot in a state in which the abdominal exterior front panel 18a is removed.

Also, though not shown in the figure, the biped ambulatory robot of this embodiment further comprises, in addition to the above-described configuration, sensors to detect the operating positions (the rotation positions of electric motors driving each joint) of each of the joints of each leg member 2 and arm member 3, sensors to detect the load and torque acting on the foot portion 13 of each leg member 2 and on the hand portion 8 of each arm member 3, and sensors to detect the angle of inclination and the inclination angular velocity of the torso 1.

The above ECU 22 exercises control of robot operation by controlling the electric motors driving each joint of the leg members 2 and arm members 3, based on information obtained from the above sensors and a program specified in advance, or based on instructions and information sent by wireless communication from outside. Here the ECU 22 exercises control to stabilize the robot posture by controlling the operation of each of the joints of the leg members 2 based on an inverted-pendulum dynamic model such as that in, for example, Japanese Patent Laid-open No. 5-337849 or U.S. Pat. No. 5,459,659.

Also, in this embodiment the above electrical storage device 19 and the auxiliary electrical storage device 24 may be, for example, lithium-ion batteries or other secondary batteries able to receive electricity, or electric double-layer capacitors or other large-capacity capacitors.

When the above-described biped ambulatory robot of this embodiment is made to stand normally on a floor F, the above ECU 22, while exercising control to stabilize the posture, causes the robot to stand on the floor F via the two leg members 2 in the standing posture shown by the solid lines in FIG. 2 (hereafter called the basic standing posture). In this basic standing posture, the posture is, except for the leg members 2, the same as the above vertically-erect posture, with the torso 1 extended in the vertical direction, and both the arm members 3, 3 also extended downward in the vertical direction.

On the other hand, in the basic standing posture, the knee joints 14 of each of the leg members 2 are bent further forward than in the case of the vertically-erect posture shown by broken lines in FIG. 2; in this basic standing posture, the robot stands on the floor F. The two leg members 2 are aligned in the robot lateral direction (in the direction in which the thigh joints 12, 12 of the two leg members 2, 2 are aligned).

In this case, the center of gravity of the entire robot (including the electrical storage device 19) in the basic standing posture (hereafter called the entire-robot standing-posture center of gravity) exists at point C in FIG. 2, and this entire-robot standing-posture center of gravity C is, as shown in the figure, positioned substantially directly above the knee joints 14 of the leg members 2 in the basic standing posture, as seen from one side of the robot. In other words, in this embodiment, the position of the above electrical storage device center of gravity A is set, relative to the above vertically-erect posture center of gravity B, such that the entire-robot standing-posture center of gravity C exists directly above the knee joints 14 of the leg members 2 when the robot is in the basic standing posture (as seen from one side of the robot; similarly below). The mounting position of the electrical storage device 19 with respect to the abdominal body frame 16 is set such that, when the electrical storage device 19 is mounted in the abdominal body frame 16, the actual center of gravity of the electrical storage device 19 is positioned at the electrical storage device center of gravity A.

The position in the robot lateral direction (the direction perpendicular to the plane of the paper in FIG. 2) of the entire-robot standing-posture center of gravity C is substantially the center position in the lateral direction.

In this way, because the entire-robot standing-posture center of gravity C exists substantially directly above the knee joints 14 of the leg members 2, there is no large torque due to the gravity of the side of the torso 1 of the robot acting on the knee joints 14. As a result, the load acting on the knee joints 14 in the above basic standing posture is small, and the robot is made to stand on the floor F in the above basic standing posture without difficulty, even if the capacity and size of the electric motors (not shown) driving the knee joints 14 are comparatively small.

In the above basic standing posture, because the entire-robot standing-posture center of gravity C is positioned directly above the knee joints 14 of the leg members 2, a torque acts from the side of the torso 1 on the ankle joints 15 of the leg members 2 in a direction causing the robot to lean forward slightly. Consequently, control to stabilize the robot posture based on an inverted-pendulum dynamic model is performed satisfactorily, and stability of the robot posture in the basic standing posture is maintained smoothly.

The biped ambulatory robot of this embodiment can itself perform operations to replace the electrical storage device 19 as follows.

If for example an instruction is sent to the robot from outside to the effect that the electrical storage device 19 is to be replaced, the robot first moves (walks) to a prescribed replacement station under control of the ECU 22. Next, the ECU 22 switches the channel for supply of power to the electrical components (electric motors and similar) of the various members of the robot from the electrical storage device 19 to the above auxiliary electrical storage device 24, by controlling a switching circuit, not shown. The ECU 22 then operates the arm members 3, 3 to remove the above abdominal exterior front panel 18a using the hand portions 8 of the arm members 3, 3. By this means, the above clasping mechanism 28 and similar is exposed to the outside. The ECU 22 then controls the arm members 3, 3 to place the removed abdominal exterior front panel 18a in a prescribed location, and then using the hand portion 8 of one arm member 3, moves the clasping pin 33 of the above clasping mechanism 28 from the above clasped position to the unclasped position, and uses the hand portion 8 of the other arm member 3 to manipulate the above lock pin 34, locking the clasping pin 33 in the unclasped position.

Next, the hand portions 8, 8 of the two arm members 3, 3 of the robot are used to grasp both sides of the electrical storage device 19 and pull the electrical storage device 19 forward from the interior space of the abdominal body frame 16, to remove the electrical storage device 19. After placing the removed electrical storage device 19 in a prescribed location, the two hand portions 8, 8 of the robot are used to grasp another new electrical storage device 19. The new electrical storage device 19, thus grasped, is mounted in the abdominal body frame 16 by the procedure opposite that used to remove the electrical storage device 19 as described above. After thus mounting the new electrical storage device 19 in the abdominal body frame 16, the ECU 22 switches the channel for supply of power to the electrical components (electric motors and similar) of the various members of the robot from the auxiliary electrical storage device 24 to the above electrical storage device 19 by control of a switching circuit, not shown.

Hence in this embodiment, by using the power from the auxiliary electrical storage device 24, the robot itself can perform the operation to remove and install the electrical storage device 19. In this case, the auxiliary electrical storage device 24 need only have capacity sufficient to provide power to perform the removal and installation of the electrical storage device 19, and so is very small and lightweight compared with the electrical storage device 19.

In the above, the case in which the robot itself performs removal and installation of the electrical storage device 19 was explained; and in the robot of this embodiment, the aperture 16c of the abdominal body frame 16 in which is mounted the electrical storage device 19 is on the front side of the robot. Consequently, an operator could easily perform by hand operations to remove and install the electrical storage device 19 with, for example, the robot in a supine position and facing upwards. In this case, the electrical storage device 19 could be removed from and installed with the robot supine and facing upwards, that is, in a state in which there would be no danger of the robot falling or other accidents.

In the embodiment described above, the aperture 16c of the abdominal body frame 16 in which is mounted the electrical storage device 19 is provided in the front surface of the robot, in order that the robot itself can perform operations to remove and install the electrical storage device 19. In cases where an operator performs the removal and installation of an electrical storage device by hand, an aperture of the electrical storage device unit can also be provided in the rear surface of the robot; in this case, operations to install or remove an electrical storage device is performed with the robot lying prone, face downward.

Also, in the above embodiment an auxiliary electrical storage device 24 is mounted on the robot as an auxiliary power supply means to supply power to operate the robot in order that the robot may itself perform removal and installation of the electrical storage device 19. However, this auxiliary power supply means may also, for example, supply operating power to the robot from a commercial power supply or similar outside the robot. In such cases, for example, the robot may also comprise a freely extractable power cord; after the robot itself extracts this power cord and connects it to an external power supply, the robot may itself perform operations to remove and install the electrical storage device, similarly to the above embodiment.

Also, in the above embodiment, the above clasping mechanism 28 was described as such that clasping and unclasping of the electrical storage device 19 is performed by manual operations; however, the robot may also comprise clasping means such that clasping and unclasping of the electrical storage device is performed by an electric motor or other actuator mounted in the robot.

What is claimed is:

1. A biped ambulatory robot, comprising an electrical storage device as a power supply for robot operation and two leg members, and which stands on a floor on a standing posture in which a knee joint in the middle portion of each of the leg members is bent further in the forward direction from the robot than in a vertically-erect posture in which each of the leg members is extended in the vertical direction, wherein:

said electrical storage device is mounted in an electrical storage device unit provided on the torso of said robot, such that the center of gravity of said electrical storage device exists at a position further forward than the center of gravity of the robot without said electrical storage device in the vertically-erect posture, and the center of gravity of the robot with the electrical storage device thus mounted in the standing posture exists substantially directly above the knee joint of each of the leg members, as seen from one side of the robot, and wherein said electrical storage device is mounted in said electrical storage device unit such that said electrical storage device is installed and removed via an aperture provided in either the front surface or the rear surface of the torso of said robot.

2. The biped ambulatory robot according to claim 1, wherein said aperture is provided in the front surface of the torso of said robot, and said electrical storage device unit is provided in a position enabling installation and removal of said electrical storage device via said aperture by operation of arm members extending from the torso of said robot; and said robot further comprising: auxiliary power supply means, other than the electrical storage device, which supplies power for the robot operation when installing and removing said electrical storage device by operation of the arm members.

3. The biped ambulatory robot according to claim 1 or claim 2, further comprising clasping:

clasping means to clasp, said electrical storage device to said electrical storage device unit releasably, in the state in which the electrical storage device is mounted in the electrical storage device unit.

4. The biped ambulatory robot according to claim 1, further comprising:

means for controlling a torque about the ankle of the biped ambulatory robot according to an inverted-pendulum dynamic model using a behavior characteristics of perturbation of behavior characteristics of perturbations in the upper body position of the robot.

* * * * *